United States Patent [19]

Uesugi

[11] Patent Number: 4,712,196

[45] Date of Patent: Dec. 8, 1987

[54] DATA PROCESSING APPARATUS

[75] Inventor: Yoshinori Uesugi, Tokyo, Japan

[73] Assignee: Casio Computer Co., Ltd., Tokyo, Japan

[21] Appl. No.: 788,251

[22] Filed: Oct. 17, 1985

[30] Foreign Application Priority Data

Dec. 21, 1984 [JP] Japan .............................. 59-268545

[51] Int. Cl.$^4$ ............................................. G11C 29/00
[52] U.S. Cl. ..................................... 365/229; 307/66
[58] Field of Search ........................ 365/226, 228, 229; 307/66

[56] References Cited

U.S. PATENT DOCUMENTS

| 3,859,638 | 1/1975 | Hume, Jr. | 365/229 |
| 4,451,742 | 5/1984 | Aswell | 307/66 |
| 4,580,248 | 4/1986 | Imaizumi | 365/229 |

Primary Examiner—Joseph A. Popek
Attorney, Agent, or Firm—Frishauf, Holtz, Goodman & Woodward

[57] ABSTRACT

A data processing apparatus has a central processing unit. The CPU causes a memory to store for example input sales data in units of department sales and other items. When a power supply is turned off, a battery supplies back-up power supply voltage to the memory to retain the storage contents of the memory. When the output voltage from the battery is decreased to a value which disables back-up of the memory, is latch circuit is set. The latch circuit is held in the set state until it is forcibly reset. Even if the power source is turned on again, the CPU inhibits sales data input to the electronic register in response to an output signal from latch circuit, thereby preventing errors in the electronic register caused by invalid data in memory.

18 Claims, 10 Drawing Figures

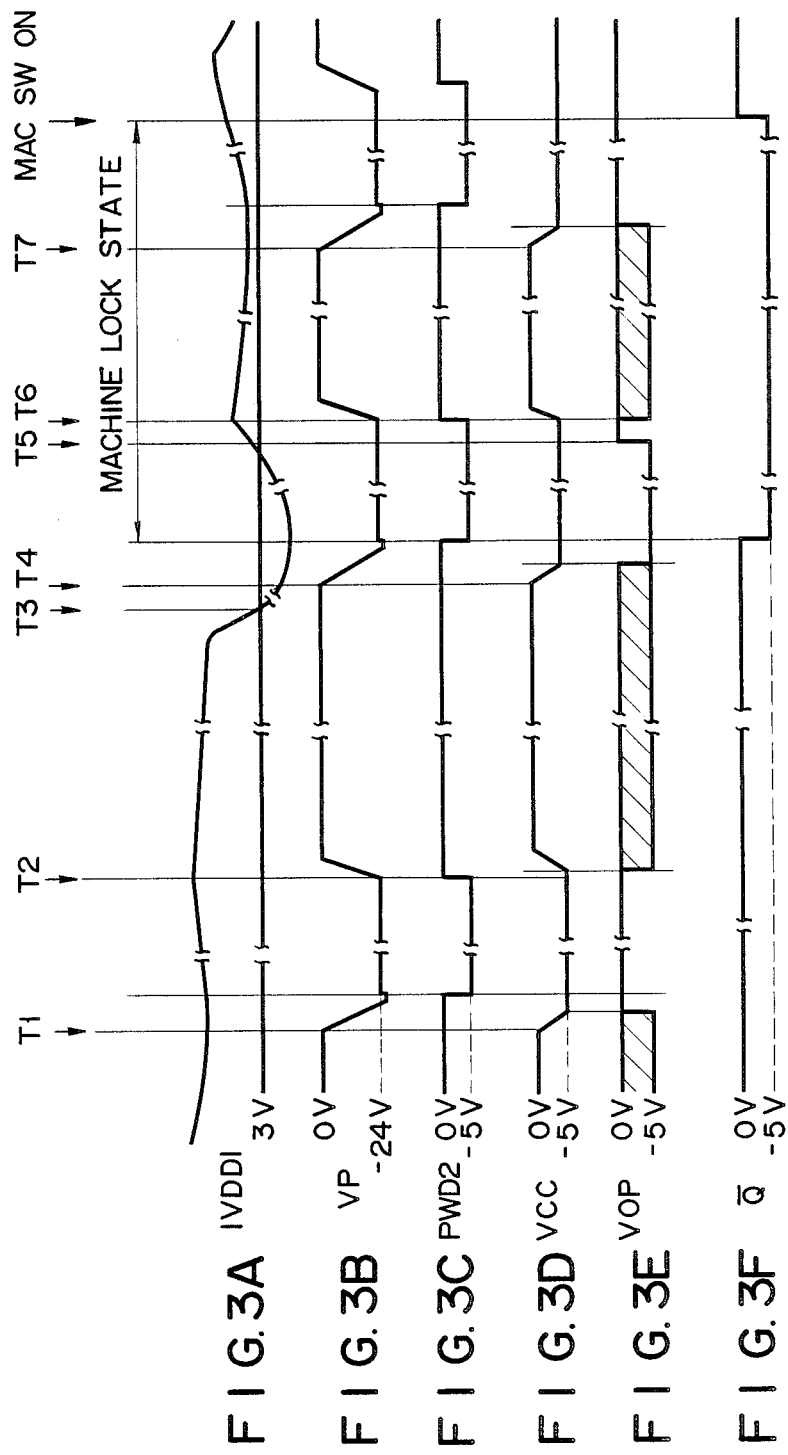

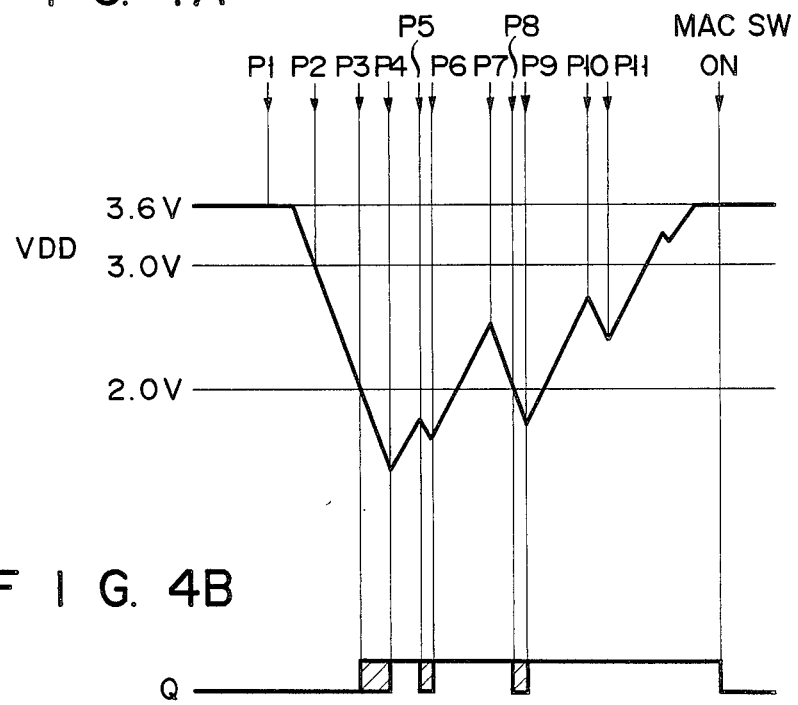
F I G. 4A
F I G. 4B

DATA PROCESSING APPARATUS

BACKGROUND OF THE INVENTION

The present invention relates to a data processing apparatus.

In a known electronic register, input data is stored in a memory and predetermined data processing is performed by using the stored data. In an AC power ON mode, a DC voltage derived from the AC power source is supplied to the memory. However, in an AC power OFF mode, an output voltage from a back-up battery is supplied to the memory. For this reason, even in the AC power OFF mode, storage data in the memory is backed up or retained.

In a conventional battery back-up system of this type, when the AC power is kept off for a long period of time, e.g., a summer vacation, the voltage of the back-up battery often becomes lower than an operating voltage. When the output voltage from the back-up battery is lower than the operating voltage, the storage contents of the memory may be lost or destroyed.

In a conventional electronic register, even if the storage contents of the memory have become indefinite, normal register operation can be restored upon ON operation of the AC power source. In this case, new data is written in addition to the error data already stored in the memory. For this reason, the new input data may also be invalid.

SUMMARY OF THE INVENTION

It is an object of the present invention to provide a data processing apparatus for inhibiting registration and processing of invalid data stored in a memory upon ON operation of an AC power source if the output voltage from a back-up battery has ever become lower than the memory data retaining voltage.

The above object of the present invention provides a data processing apparatus for restoring accurate registration and processing even if the storage contents of the memory are lost due to a decrease in output voltage from the back-up battery.

In order to achieve the above object of the present invention, there is provided a data processing apparatus comprising:

data storage means (7) for storing data;

a power supply (1, 3, 5) for supplying power to the data storage means;

a battery (E) for supplying a back-up voltage to the data storage means (7) and protecting the data in the data storage means (7) when the power source (1, 3, 5) is turned off;

comparing means (9) for comparing an output voltage from the battery (E) with a predetermined reference voltage;

retaining means (113) for retaining a comparison result from the comparing means (9); and means for outputting contents from the retaining means (113) when the power source (1, 3, 5) is turned on.

In the data processing apparatus having the arrangement described above, once the output voltage from the back-up battery has become lower than a minimum operating voltage and the data stored in the storage means may have been lost, a corresponding comparison result is stored in the retaining means. When the main power source is turned on again, the output means generates a signal indicating that the storage contents in the memory means may be invalid. For this reason, it is necessary to prevent additional data from being inputted and becoming corrupted by the prior invalid data.

BRIEF DESCRIPTION OF THE DRAWINGS

FIGS. 3A to 3F are respectively timing charts showing the relationship between an output voltage from the battery of FIG. 1 and voltages of the respective components of the electronic register; and FIGS. 4A and 4B are respectively timing charts showing the relationship between the output voltage from the battery of FIG. 1 and an output signal from a flip-flop of FIG. 2.

DETAILED DESCRIPTION OF THE PREFERRED EMBODIMENT

An electronic register according to an embodiment of the present invention will be described with reference to the accompanying drawings.

The system configuration of the electronic register will be described with reference to FIG. 1.

Figure 1:
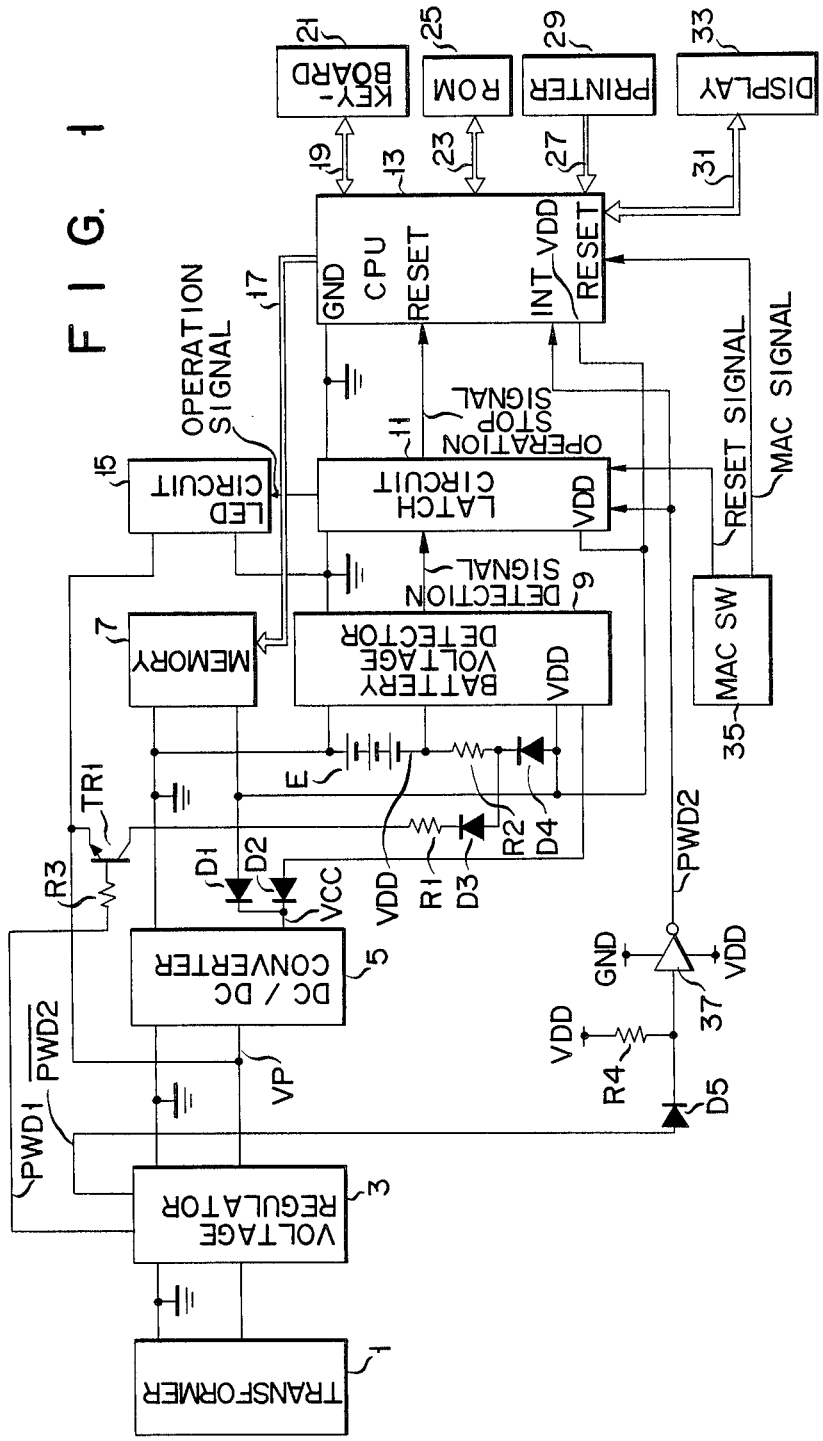
FIG. 1 is a block diagram of an electronic register according to an embodiment of the present invention.

Referring to FIG. 1, a voltage from a commercial AC power source (not shown) is applied to a transformer 1. The output terminal of the transformer 1 is connected to a voltage regulator 3. The output terminal of the regulator 3 is connected to the input terminal of a DC/DC converter 5 for stepping down the input voltage. The output terminal of the converter 5 is connected to power source terminals of a memory 7, a battery voltage detector 9, a latch circuit 11 and a CPU 13 through a reverse flow preventive diode D1. The output terminal of the converter 5 is also connected to the detector 9 through a reverse flow preventive diode D2.

The output terminal of the regulator 3 is connected to the emitter of an npn transistor TR1. The collector of the transistor TR1 is connected to the negative terminal of the back-up battery E through a current limiting resistor R1, a reverse flow preventive diode D3 and a current limiting resistor R2. The base of the transistor TR1 receives a signal PWD1 (to be described later). A reverse flow preventive diode D4 is connected between the power source terminal of the detector 9 and the resistor R2. The output terminal of the regulator 3 is connected to the power source terminal of an LED circuit 15.

The negative terminal of the back-up battery E is connected to the power source terminal of the detector 9. An output voltage VDD from the battery E is applied to the detector 9. The positive terminal of the battery E is grounded.

The output terminal of the detector 9 is connected to the input terminal of the circuit 11. The first output terminal of the circuit 11 is connected to the CPU 13 and supplies an operation stop signal thereto. The second output terminal of the circuit 11 is connected to the circuit 15 and supplies an operation signal thereto.

The CPU 13 is connected to the memory 7 through a bus 17. The CPU 13 is connected to a ROM (read-only memory) 25 and a keyboard 21 through buses 23 and 19. The CPU 13 is further connected to a printer 29 and a display 33 through buses 27 and 31.

The first output terminal of a memory all clear switch (MAC SW) 35 is connected to the circuit 11 and supplies a reset signal thereto. The second output terminal of the switch 35 is connected to the reset terminal of the CPU and supplies a MAC signal thereto.

The first control terminal of the regulator 3 is connected to the base of the transistor TR1 through a current-limiting resistor R3 and supplies the control signal PWD1 thereto. The second control terminal of the regulator 3 is connected to an inverter 37 through a reverse flow preventive diode D5 and supplies a second control signal $\overline{PWD2}$ thereto. The input terminal of the inverter 37 is connected to a pull-up resistor R4, which receives the output signal VDD from the battery E. The output terminal of the inverter 37 is connected to the circuit 11 and the CPU 13 and supplies the signal $\overline{PWD2}$ thereto.

A ground voltage is applied to the ground terminals of the transformer 1, the regulator 3, the converter 5, the memory 7, the detector 9, the circuit 11, the CPU 13 and the circuit 15.

The basic operations of the respective components of the data processing apparatus described above will be described hereinafter.

The regulator 3 generates a predetermined DC voltage VP ($-24$ V). When the voltage VP is stabilized, the signal PWD1 of H (ground) level and the signal $\overline{PWD2}$ of L level are generated. An inverted signal PWD2 of the signal $\overline{PWD2}$ is supplied to the circuit 11 and the CPU 13.

The circuit 11 and the CPU 13 are controlled in response to the signal PWD2. The signals PWD1 and $\overline{PWD2}$ have opposite signal levels.

The converter 5 supplies a voltage VCC ($-5$ V) to the memory 7, the detector 9, the circuit 11 and the CPU 13.

In the AC power OFF mode, the back-up battery E supplies the power source voltage VDD to the detector 9, the circuit 11 and the CPU 13. A discharge circuit of the battery E constitutes a power source back-up circuit for the memory 7, the circuit 11 and so on. In the AC power ON mode, when the voltage VP is stabilized, the signal PWD1 is set at H level. For this reason, the transistor TR1 is turned on. A current flows from the ground level through the battery E, the resistor R2, the diode D3, the resistor R1 and the transistor TR1, so that the battery E is charged.

The memory 7 comprises a RAM. The memory 7 stores, for example, total sales data in units of sales departments and transactions. When the power source voltage is within the range of $-3.0$ V to $-5.0$ V, the memory 7 can properly retain the data. A voltage in the range of $-3.0$ V to $-5.0$ V having a minimum absolute value is defined as the possible operation voltage. For this reason, when the voltage VDD falls below the possible operation voltage, the storage contents of the memory 7 may be lost or destroyed.

The detector 9 detects whether or not the output voltage VDD of the battery E exceeds the predetermined reference voltage. In other words, the detector 9 checks if the output voltage VDD from the battery E is lower than $-3$ V defining the possible operation voltage. A detection signal from the detector 9 is supplied to the circuit 11. The circuit 11 can be operated at a voltage of $-2$ V which is higher than the possible operation voltage ($-3$ V) of the detector 9. The possible operation voltage of the circuit 11 is down to $-2$ V. The circuit 11 stores the detection result of the detector 9.

The circuit 15, responsive to the operation signal, indicates that the CPU 13 is held in the operation inhibit state.

The CPU 13 performs various control and arithmetic operations in accordance with a control program stored in the ROM 25.

When the switch 35 is operated, the reset signal is supplied to the circuit 11, and the latched content is reset. The MAC signal is supplied from the switch 35 to the CPU 13. The CPU 13 clears the contents of the memory 7 in response to the MAC signal.

Figure 2:
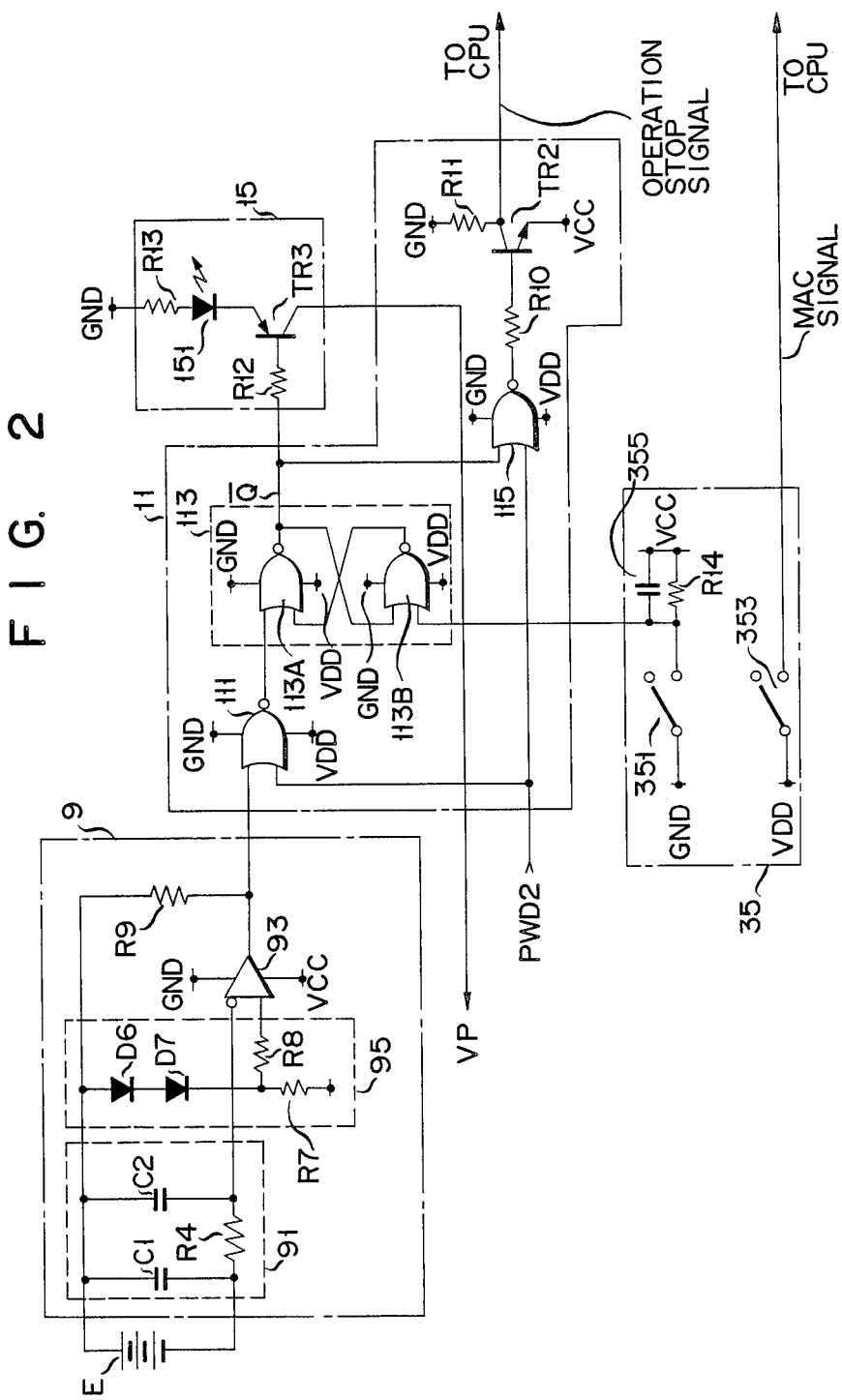
FIG. 2 is a circuit diagram showing the detailed configuration of the electronic register of FIG. 1.

Detailed arrangements of the detector 9, the circuits 11 and 15 and the switch 35 will be described with reference to FIG. 2.

The detector 9 has a smoothing circuit 91 connected in parallel with the battery E. The smoothing circuit 91 consists of a first capacitor C1 connected in parallel with the battery E, a resistor R4 current path, one end of which is connected to the negative terminal of the battery E, and a second capacitor C2 connected between the positive terminal of the battery E and the other end of the resistor R4. The output terminal (i.e., the junction between the resistor R4 and the capacitor C2) of the circuit 91 is connected to the inverting input terminal of an operational amplifier 93.

The noninverting input terminal of the operational amplifier 93 receives a reference voltage supplied from a reference voltage generator 95. The generator 95 has diodes D6 and D7 and resistors R7 and R8. The anode of the diode D6 is grounded. The cathode of the diode D7 is connected to the anode of the diode D6 and to the output terminal of the converter 5 through the resistor R7. The junction between the resistor R7 and the diode D7 is connected to the noninverting input terminal of the amplifier 93 through the resistor R8. The predetermined reference voltage ($-3$ V) is supplied from the generator 95 to the noninverting input terminal of the amplifier 93. The reference voltage is set to be $-3$ V since the possible operation voltage of the memory 7 is $-3$ V.

The amplifier 93 compares two input voltages. The amplifier 93 is operated in response to the output voltage VCC from the converter 5. A signal stabilizing resistor R9 is inserted between the output terminal of the amplifier 93 and ground. An output from the amplifier 93 serves as an output from the detector 9.

The latch circuit 11 is arranged as follows. The output terminal (i.e., the output terminal of the operational amplifier 93) of the detector 9 is connected to one input terminal of a NOR gate 111. The other input terminal of the NOR gate 111 is connected to the output terminal of the inverter 37 to receive the signal PWD2. The NOR gate 111 controls an input (the output signal from the detector 9) to an RS flip-flop (to be described later) in response to the signal PWD2. The output terminal of the NOR gate 111 is connected to the set input terminal of the RS flip-flop 113. The reset terminal of the RS flip-flop 113 is connected to the switch 35 and receives the reset signal.

The flip-flop 113 comprises first and second cross-coupled NOR gates. One input terminal of a NOR gate 113A is connected to the detector 9. The output terminal of the NOR gate 113B is connected to the other input terminal of the NOR gate 113A. The other input terminal of the NOR gate 113B is connected to the switch 35. The $\overline{Q}$ output terminal (the output terminal of the NOR gate 113A) of the flip-flop 113 is connected to one input terminal of a NOR gate 115. The other input terminal of the NOR gate 115 is connected to the output terminal of the inverter 37 and receives the signal PWD2.

The output terminal of the NOR gate 115 is connected to the base of a transistor TR2 through a resistor R10. The NOR gate 115 causes the transistor TR2 to turn on/off in response to the signal PWD2 and the output signal from the flip-flop 113. The emitter of the transistor TR2 is connected to the output terminal of the converter 5 and receives the voltage VCC. The collector of the transistor TR2 is grounded through a resistor R11. A voltage at the junction between the collector of the transistor TR2 and a current limiting resistor R11 is supplied as an operation stop signal to the CPU 13.

The NOR gates 111, 113A, 113B and 115 receive the output voltage VDD from the battery E and are operated in the AC power OFF mode. However, in the AC power ON mode, they are operated in response to the voltage VCC.

The LED circuit 15 is arranged in the following manner. The base of a pnp transistor TR3 is connected to the $\overline{Q}$ output terminal (i.e., the output terminal of the NOR gate 113A) of the flip-flop 113 through a current limiting resistor R12. The emitter of the transistor TR3 is connected to the cathode of a light-emitting diode (LED) 151. The anode of the LED 151 is grounded through the resistor R13. The collector of the transistor TR3 is connected to the output terminal of the regulator 3 and receives the voltage VP. As a result, the transistor TR3 is controlled in response to the output signal from the flip-flop 113 to turn on/off the circuit 15.

The MAC switch 35 comprises first and second switches 351 and 353. The first switch 351 is interlocked with the second switch 353. One stationary contact of the first switch 351 is grounded. The other stationary contact of the switch 351 is connected to the output terminal of the converter 5 through a wave generator constituted by a resistor R14 and a capacitor 355. The other stationary contact receives the voltage VCC. The other stationary contact of the switch 351 is connected to the NOR gate 113B constituting the flip-flop 113 and supplies the reset signal of ground level thereto. One stationary contact of the switch 353 is connected to the output terminal of the converter 5 and receives the voltage VCC. The other stationary contact of the switch 353 is connected to the CPU 13 and receives the MAC signal of VDD level.

The operation of the electronic register having the arrangement shown in FIGS. 1 and 2 will be described hereinafter.

When the AC power source is turned on, an AC voltage is applied to the transformer 1. The regulator 3 generates a voltage of −24 V, and the converter 5 generates a voltage of −5 V.

In the registration mode, data entered at the keyboard 21 is supplied to the CPU 13. The CPU 13 processes the input data in accordance with the control program stored in the ROM 25. The CPU 13 causes the printer 29 and the display 33 to print out and display the processed data, as needed. The CPU 13 causes the memory 7 to store total sales data, the department sales data and transaction data. The CPU 13 processes the data stored in the memory 7, as needed.

The operation of the memory 7, the detector 9 and the circuit 11 will be described with reference to FIGS. 3A to 3F. FIG. 3A shows the relationship between the absolute value of the output voltage VDD from the battery E and the absolute value of the reference voltage (−3 V in this embodiment) supplied to the amplifier 93. FIG. 3E shows an output state of the amplifier 93. A hashed portion represents an indefinite state of the output voltage of the amplifier 93. FIG. 3F shows the signal waveform of the $\overline{Q}$ output signal from the flip-flop 113. H level indicates that the flip-flop 113 is in the reset state, and L level indicates that the flip-flop 113 is in the set state.

The states of the respective components and signals will be described in time relationship so as to best understand the operation of the electronic register. Assume that the RS flip-flop 113 is initially reset.

The regulator 3 and the converter 5 are kept disabled until the AC power source is turned on. For this reason, the output voltages VP and VCC are held at ground level. The amplifier 93 in the detector 9 is operated in response to the output signal VCC from the converter 5. While the AC power source is kept off, the output signal from the amplifier 93 is indefinite. The memory 7 is powered by the output voltage VDD from the battery E, so that the absolute value of the voltage VDD from the battery E gradually decreases. Since the circuit 11 is operated in response to the voltage VDD from the battery, the flip-flop 113 is held in the reset state.

At time T1, the AC power source is turned on. In this state, the voltages VP and VCC are generated. The memory 7, the detector 9, the circuit 11, the CPU 13 and the inverter 37 are operated on the basis of the voltage VCC. Upon reception of the voltage VCC, the amplifier 93 compares the output voltage from the battery E with the reference voltage.

When the output voltage VP from the regulator 3 is stabilized, the regulator 3 sets the signal $\overline{PWD2}$ at H level. Stabilization of the voltage VP is slower than for the voltage VCC in accordance with the output level relationship. When a predetermined period of time has elapsed after the voltage VCC is stabilized, the signal PWD2 is set at L level. In response to the signal PWD2, the output signal from the detector 9 is supplied to the flip-flop 113. The absolute value of the output voltage VDD from the battery E is larger than that of the reference voltage. The output signal from the amplifier 93 is set at H (ground) level. For this reason, the output from the NOR gate 111 is set at L (VCC) level. The flip-flop 113 is held in the reset state. Upon reception of the signal PWD1, the transistor TR1 is turned on, so that the battery is rapidly charged with the voltage VP.

Assume that the AC power source is turned off at time T2. The voltages VP and VCC are set at ground level. The output voltage from the battery E is discharged through the discharge circuit and is gradually decreased. In this case, the output from the amplifier 93 is held indefinite since the voltage VCC is set at the ground level. Meanwhile, the flip-flop 113 is operated upon reception of the output voltage VDD from the battery E and is held in the reset state.

Now assume that a long period of time has elapsed and at time T3, the absolute value of the output VDD from the battery E has become smaller than that of the reference voltage. In this case, the storage contents of the memory 7 may be lost. The detector 9 is held disabled, and the flip-flop 113 is held in the reset state.

When the AC power source is turned on at time T4, the amplifier 93 is operated after the voltage VCC is stabilized. In this case, the absolute value of the output voltage VDD from the battery E is smaller than that of the reference voltage. The amplifier 93 generates a signal of L level (VCC level), and then the signal PWD2 is set at L level, so that the output from the NOR gate 111 is set at logic "1" and the flip-flop 113 is set. The $\overline{Q}$ output signal from the flip-flop 113 is set at L level. Upon reception of the $\overline{Q}$ output signal of L level, the transistor TR2 is turned on, and the operation stop signal is set at L level. As a result, the reset terminal of the CPU 13 receives the operation stop signal of L level, so that a machine lock state is obtained.

The machine lock state is defined as a state inhibiting a specified operation of the CPU 13, for example, data input from the keyboard 21 to the CPU 13.

The machine lock state is maintained even if the absolute value of the output voltage VDD from the battery E becomes larger than that of the reference voltage at time T5. This is because the flip-flop 113 is maintained in the set state.

In the set state of the flip-flop 113, the transistor TR3 in the circuit 15 is turned on in response to the $\overline{Q}$ output signal from the flip-flop 113. A current flows through the LED 151 which then emits light, thereby indicating that the absolute value of the output signal VDD from the battery E was smaller than that of the reference voltage.

Again assume that the AC power source is turned off at time T6. Even in this case, the flip-flop 113 is held in the set state. As a result, the machine lock state is maintained.

When the AC power source is turned on at time T7, the set state of the flip-flop 113 is maintained. The operation stop signal of L level is supplied to the CPU 13, and thus the machine lock state of the CPU 13 is held throughout. Further LED circuit 15 is operated. In this case, no data can be entered at the keyboard 21.

When the switch 35 is manually actuated, the reset signal of H level is supplied to the reset terminal of the flip-flop 113, so that the flip-flop 113 is reset. The $\overline{Q}$ output signal from the flip-flop 113 goes to H level. The output signal from the NOR gate 115 is set at L level. The transistor TR2 is turned off, and the operation stop request signal is set at H level. As a result, the machine lock state is cancelled. Data can be entered at the keyboard 21. Furthermore, the transistor TR3 is turned off in response to the $\overline{Q}$ signal, and the circuit 15 is disabled.

The MAC signal from the switch 35 is supplied to the reset terminal of the CPU 13. The CPU 13 sequentially writes data "0" in the memory 7 in response to the MAC signal and thus clears the storage contents of the memory 7.

The normal registration operation of the electronic register can then be performed.

In the embodiment described above, when the output voltage VDD from the battery E exceeds the reference voltage (i.e., the absolute value of the output voltage VDD from the battery E is smaller than the absolute value of the reference voltage), the flip-flop 113 is set. Thereafter, even if the AC power source is turned on and the output voltage VDD from the battery E smaller than the reference voltage, the machine lock state is retained until the switch 35 is operated. Data input to the electronic register cannot be performed. Also when the machine lock state is set upon ON operation of the power source, the circuit 15 is operated to indicate to the operator that the electronic register is set in the machine lock state.

Thus when the storage contents of the memory 7 are indefinite due to a decrease in output from the battery E, new data is not written on error data stored in the memory. The power source system of the electronic register is a double source system. The battery E is charged with the voltage VP at high speed.

Even if the machine lock state is set, only data input at the keybord 21 is inhibited. For example, when the CPU 13 has a timer circuit, the timer can count the clock pulses irrespective of the operation state of the flip-flop 113.

When the battery E has been discharged for a long period of time and the absolute value of the output voltage VDD becomes smaller than that of the possible operation voltage of the circuit 11, the storage contents of the flip-flop 113 become indefinite. In this case, the operation of the electronic register will be described with reference to FIGS. 4A and 4B. FIG. 4A shows a change in the absolute value of the output voltage from the battery E as a function of time. FIG. 4B shows operation states of the flip-flop 113. H level represents the flip-flop 113 in the set state, and L level represents the flip-flop 113 in the reset state. A hashed portion indicates that the flip-flop 113 is at an indefinite level.

The operation will be described in time relationship with reference to FIGS. 4A and 4B.

Assume that the flip-flop 113 is reset. The battery E is sufficiently charged, and the AC power source is turned off at time P1 at which the absolute value of the output voltage therefrom is set at a voltage of 3.6 V. The absolute value of the output voltage from the battery E gradually decreases. Even when the absolute value of the output voltage from the battery E becomes lower than 3 V at time P2, the flip-flop 113 is held in the reset state. When the absolute value of the voltage VDD is further decreased below 2 V at time P3, the flip-flop 113 is set in the indefinite state.

Assume that the AC power source is turned on at time P4. The voltage VCC is applied to the circuit 11. The flip-flop 113 is thus operated in the normal state. Since the absolute value of the voltage VDD is smaller than that of the reference voltage, the flip-flop 113 is held in the set state.

When the AC power source is turned off at time P5, the flip-flop 113 is held in the indefinite state. When the power source is turned on again at time P6, the absolute value of the voltage VDD is gradually increased. In this case, since the voltage VDD is applied to the flip-flop 113, the flip-flop is set. Therefore even if the AC power source is turned on, data input cannot be performed.

When the AC power source is turned off at time P7, the flip-flop 113 is held in the set state until the absolute value of the voltage VDD becomes lower than 2 V. When this absolute value becomes less than 2 V at time P8, the flip-flop 113 is set indefinitely.

When the AC power source is turned on at time P9, the flip-flop 113 is set upon reception of the voltage VCC. Even if the AC power source is turned off at time P10, the flip-flop 113 is held in the set state since the absolute value of the voltage VDD is higher than that of the minimum possible operation voltage of the flip-flop 113. Thereafter, when the power source is turned on at time P11, the flip-flop 113 is held in the set state. Even if the absolute value of the voltage of the battery E recovers to beyond 3 V, i.e. exceeds the minimum absolute value of the operating voltages of the memory 7, the flip-flop 113 is held in the set state until the switch 35 is manually actuated.

The flip-flop 113 is reset upon actuation of the switch 35. Only thereafter, data input at the keyboard 21 can be performed.

In this manner, when the absolute value of the output voltage from the battery E becomes smaller than that of the possible operation voltage of the flip-flop 113, the contents of the flip-flop 113 become indefinite. However, when the AC power source is turned on, the output voltage VDD from the battery E must cross the range between −2 V and −3 V. During this transition time, the flip-flop 113 is set and the machine lock state is held.

Once the absolute value of the output voltage VDD from the battery E becomes smaller than that of the reference voltage, the machine lock state is held even if the AC power source is turned on, thereby inhibiting data input to the electronic register. This inhibit state continues until the storage contents of the memory 7 are cleared upon manual actuation of the switch 35.

When the electronic register of this embodiment is used, the operation of the CPU is inhibited upon restoration of the AC power source any time the absolute value of the output voltage from the battery E has become smaller than that of the reference voltage. As a result, new data is not written on error data stored in the memory and new data is not thereby invalidated.

In this embodiment, data input at the keyboard 21 is inhibited in the machine lock state. However, the present invention is not limited to this. All operations of parts using the memory 7 may be inhibited. For example, data transmission between the electronic register and a host computer may be inhibited. Furthermore, data display may also be inhibited.

The present invention is not limited to the electronic register exemplified in the above embodiment, but can be extended to other data processing equipment in addition to the electronic register. In the above embodiment, the possible operating voltage of the memory is −3 V, and the possible operating voltage of the circuit 11 is −2 V. However, the present invention is not limited to this. The possible operation voltages can be arbitrarily set. The electronic register in the above embodiment is operated by negative voltages, but is not limited to this. For example, the electronic register may be operated with a positive voltage. In the arrangement of the above embodiment, the regulator 3 and the converter 5 are used to charge the battery E at high speed. Therefore, only one regulator for generating a voltage of −5 V can be used. The arrangement of the detector 9, the circuits 11 and 15 and so on is not limited to that illustrated in FIG. 2. Furthermore, the smoothing circuit 91 need not be arranged. A conventional generator can be used as the reference voltage generator 95.

What is claimed is:

1. A data processing apparatus with a memory back-up system comprising:
   data storing means for storing data;
   data processing means, coupled to said data storing means, for processing data stored in said data storing means;
   main power supply means for supplying electrical power to said data storing means and to said data processing means;
   back-up battery means;
   switching means coupled to said back-up battery means for supplying electrical power of said back-up battery means to said data storing means when the electrical power of said main power supply means is not supplied to said data storing means, and for immediately supplying the electrical power of said main power supply means to said data storing means when said power of said main power supply means can be supplied to said data storing means;
   detecting means, separate from and operable independently of said data processing means, for detecting when an output voltage of said back-up battery means falls below a predetermined voltage level below which said back-up battery means is incapable of supplying sufficient output voltage to enable said data storing means to retain data when the power of said back-up battery means is supplied to said data storing means, and for outputting a detection signal indicating that said output voltage of said back-up battery means has fallen below said predetermined voltage level;
   retaining means for receiving and retaining said detection signal from said detecting means; and
   display means for producing a predetermined display in accordance with said detection signal of said retaining means when power is supplied from said main power supply means to thereby display that said voltage of said back-up battery means has fallen below said predetermined voltage value.

2. The data processing apparatus of claim 1, wherein said data processing apparatus further comprises input means ooupled to said data processing means for inputting a clearing instruction; and said data processing means further comprises clearing means for clearing the detection signal retained in said retaining means upon receipt of said clearing instruction.

3. The data processing apparatus of claim 2, wherein said clearing means includes means for erasing the data stored in said storing means upon receipt of a clearing instruction.

4. The data procesing apparatus of claim 2, wherein said data processing means further comprises means for clearing the data stored in said data storing means upon receipt of said clearing instruction.

5. The data processing apparatus of claim 1, wherein said data processing apparatus further comprises input means coupled to said data processing means for inputting data to said data processing means; and said data processing means further comprises inhibiting means for inhibiting data from being inputted tosaid data processing means from said input means.

6. The data processing apparatus of claim 1, wherein said back-up battery means is a rechargeable back-up battery; and said data processing apparatus further comprises recharging means for supplying a charging voltage to said rechargeable back-up battery when a signal indicative of supply of a normal operating voltage is output from said main power supply means.

7. A data processing apparatus with a memory back-up system, comprising:
   data storing means for storing data;
   data processing means coupled to said data storing means for processing data stored in said data storing means;
   main power supply means for supplying electrical power to said data storing means and to said data processing means;
   back-up battery means;
   switching means coupled to said back-up battery means for supplying electrical power from said back-up battery means to said data storing means when the electrical power of said main power supply means is not supplied to said data storing means, and for immediately supplying the electrical power of said main power supply means to said data storing means when said power of said main power supply means can be supplied to said data storing means;

detecting means, separate from and operable independently of said data processing means, for detecting when an output voltage of said back-up battery means falls below a predetermined voltage level below which said back-up battery means is incapable of supplying sufficient output voltage to enable said data storing means to retain data when the power of said back-up battery means is supplied to said data storing means;

means coupled to said datecting means for indicating the detection state of said detecting means when power is supplied from said main power supply means; and means coupled to said data processing means for inputting a clearing instruction to said data processing means;

said data processing means including means for erasing the data stored in said data storing means upon receipt of said clearing instruction.

8. The data processing apparatus of claim 7, wherein said data processing apparatus furthe comprises input means coupled to said data processing means for inputting data; and said data processing means further comprises inhibiting means for inhibiting data from being input to said data processing means from said input means responsive to said detecting means detecting that the output voltage of said back-up battery means has fallen below said predetermined voltage below which said back-up battery means is incapable of retaining the data stored in said data storing means.

9. The data processing apparatus of claim 7, wherein said back-up battery means is a rechargeable back-up battery; and said data processing apparatus further comprises recharging means for supplying a charging voltage to said rechargeable back-up battery when a signal indicative of supply of a normal operating voltage is output from said main power supply means.

10. The data processing apparatus of claim 7, further comprising display means coupled to said detecting means for producing a predetermined display indicating that said detecting means detected that said voltage of said back-up battery means has fallen below said predetermined voltage level.

11. The data processing apparatus of claim 10, further comprising retaining means coupling to said detecting means for retaining a signal output from said detecting means when said voltage of said back-up battery means falls below said predetermined voltage level.

12. A data processing apparatus with a memory back-up system, comprising:

data storing means for storing data;

data processing means, coupled to said data storing means, for processing data storing in said data storing means;

main power supply means for supplying electrical power to said data storing means and to said data processing means;

back-up battery means;

switching means coupled to said back-up battery means for supplying electrical power of said back-up battery means to said data storing means when the electrical power of said main power supply means is not supplied to said data storing means, and for immediately supplying the electrical power of said main power supply means to said data storing means when said power of said main power supply means can be supplied to said data storing means;

detecting means, separate from and operable independently of said data processing means, for detecting when an output voltage of said back-up battery means falls below a predetermined voltage level below which said back-up battery means is incapable of supplying sufficient output voltage to enable said data storing means to retain data when the power of said back-up battery means is supplied to said data storing means, and for outputting a detection signal indicating that said output voltage of said back-up battery means for fallen below said predetermined voltage level;

indication means responsive to said detection signal from said detecting means for producing a predetermined indication when power is supplied from said main power supply means to indicate that said voltage of said back-up battery means has fallen below said predetermined voltage value.

13. The data processing apparatus of claim 12, wherein said data processing apparatus further comprises input means coupled to said data processing means for inputting a clearing instruction; and said data processing means further comprises clearing means for clearing the detection signal retained in said retaining means upon receipt of said clearing instruction.

14. The data processing apparatus of claim 13, wherein said clearing means includes means for erasing the data stored in said storing means upon receipt of a clearing instruction.

15. The date processing apparatus of claim 13, wherein said data processing means further comprises means for clearing the data stored in said data storing means upon receipt of said clearing instruction.

16. The data processing appartus of claim 12, wherein said data processing apparatus further comprises input means coupled to said dat processing means for inputting data to said data processing means; and said data processing means further comprises inhibiting means for inhibiting data from being inputted to said data processing means for said input means.

17. The data processing apparatus of claim 12, wherein said back-up battery means is a rechargeable back-up battery; and said data processing apparatus further comprises recharging means for supplying a charging voltage to said rechargeable back-up when a signal indicative of supply of a normal operating voltage is output from said main power supply means.

18. The data processing apparatus of claim 12, wherein said indication means comprises a visual indication means.

* * * * *